US010253918B2

(12) United States Patent
McCormick

(10) Patent No.: US 10,253,918 B2
(45) Date of Patent: Apr. 9, 2019

(54) INSULATED STORAGE AND TRANSPORTATION CONTAINERS

(75) Inventor: Bruce McCormick, Sante Fe, NM (US)

(73) Assignee: SAVSU TECHNOLOGIES LLC, Old Bethpage, NY (US)

( * ) Notice: Subject to any disclaimer, the term of this patent is extended or adjusted under 35 U.S.C. 154(b) by 0 days.

(21) Appl. No.: 13/333,386

(22) Filed: Dec. 21, 2011

(65) Prior Publication Data
US 2012/0318808 A1    Dec. 20, 2012

Related U.S. Application Data

(60) Provisional application No. 61/425,527, filed on Dec. 21, 2010.

(51) Int. Cl.
  *B65D 81/18* (2006.01)
  *B65D 81/20* (2006.01)
  *F16L 59/065* (2006.01)

(52) U.S. Cl.
  CPC ........... *F16L 59/065* (2013.01); *B65D 81/18* (2013.01); *B65D 81/2076* (2013.01)

(58) Field of Classification Search
  USPC ........ 220/592.2, 4.16, 4.28, 4.33, 4.34, 586, 220/62.11, 62.18, 62.19, 666, 680, 293; 264/46.5
  See application file for complete search history.

(56) References Cited

U.S. PATENT DOCUMENTS

| | | | |
|---|---|---|---|
| 4,044,449 A * | 8/1977 | Phan | 29/460 |
| 5,091,233 A * | 2/1992 | Kirby et al. | 428/69 |
| 6,164,030 A * | 12/2000 | Dietrich | 52/406.2 |
| 7,530,204 B2 * | 5/2009 | Cook et al. | 52/281 |
| 2004/0180176 A1 * | 9/2004 | Rusek, Jr. | 428/69 |
| 2005/0189404 A1 * | 9/2005 | Xiaohai et al. | 229/103.11 |
| 2007/0152551 A1 * | 7/2007 | Kim et al. | 312/401 |

(Continued)

FOREIGN PATENT DOCUMENTS

| | | |
|---|---|---|
| JP | 55176178 | 12/1980 |
| JP | 01308785 | 12/1989 |

OTHER PUBLICATIONS

Thermal Conductivity of sopme common Materials, http://www.engineeringtoolbox.com/thermal-conductivity-d_429.html, Feb. 16, 2006.*

(Continued)

*Primary Examiner* — Jeffrey R Allen
(74) *Attorney, Agent, or Firm* — Reising Ethington P.C.

(57) ABSTRACT

A storage container that includes walls having complimentary-shaped edges with complex edge profiles. The complex edge profiles of adjoining walls mate with each other to form an interface that defines a thermal leak path between a storage area of the container and an exterior environment. The thermal leak path has a length that is greater than the thickness of the adjoined walls. In one example, the complex edge profile includes step-shaped features. The walls may also include one or more overlapping super-insulating panels. The panels may be joined to one another with adhesive layers. The super-insulating panels may be also be disposed in a wall including interior and exterior linings that are joined and sealed to define a space between the linings. The space may be evacuated and optionally filled with a super-insulating gas.

4 Claims, 5 Drawing Sheets

(56) References Cited

U.S. PATENT DOCUMENTS

2009/0179541 A1* 7/2009 Smith et al. .................. 312/406
2010/0018981 A1 1/2010 Hyde et al.

OTHER PUBLICATIONS

International Search Report for PCT/US2011/066551 dated Sep. 26, 2012, 3 pages.
Written Opinion for PCT/US2011/066551 dated Sep. 26, 2012, 6 pages.

* cited by examiner

INSULATED STORAGE AND TRANSPORTATION CONTAINERS

CROSS REFERENCE TO RELATED APPLICATION

This application claims the benefit of Provisional Application No. 61/425,527, filed Dec. 21, 2010, the entire contents of which are hereby incorporated by reference.

TECHNICAL FIELD

The present disclosure relates generally to thermally insulated storage containers and, more particularly, to storage containers that can maintain their contents within a particular temperature range for an extended period of time.

BACKGROUND

Thermally insulated storage containers can provide a storage area that may slow the temperature change of its contents, either by slowing the loss of thermal energy from the storage area to a cooler exterior environment, or by slowing the transfer of thermal energy from a warmer exterior environment to the storage area and its contents. While certain uses of insulated storage containers are mainly for convenience or comfort, such as keeping beverages warm or cool for longer periods of time without refrigeration, other uses of insulated storage containers may be critical to prevent damage and/or loss of important contents such as medicines, vaccines, biological materials, spoilable food product, or organs awaiting transplant, to name a few. Unlike a beverage that can be cooled again if the storage container allows it to become too warm to enjoy, some goods having biological materials may have living components or tissue that cannot be brought back to life once they fall outside a particular temperature range. Even certain medicines and vaccines that do not contain biological materials may include chemical compositions that become unstable outside a particular temperature range and cannot be restabilized. For example, some such materials must be kept continuously at temperatures ranging from 2° C. to 8° C., a relatively narrow temperature range above which degradation of the materials can occur, and below which destruction by freezing can occur.

Because these types of temperature sensitive materials can often be expensive to produce and replace, losses due to inadequate temperature maintenance can be excessive economically, reduce adequate access to medicines by those in need of them, or in some cases can be the difference between life and death. Compounding these problems is the fact that oftentimes the populations of the world that are most in need of medicines and vaccines, for example, are located in remote and/or underdeveloped areas. It is often the case that electrically powered refrigeration is unlikely to be widely available in such areas. In these instances, available electrical refrigeration units may be many miles from one another, requiring transport without refrigeration for extended periods of time. Even where refrigerated transportation means are available, local refrigerated storage at destinations in some underdeveloped areas of the world may be subject to frequent power outages, voltage spikes, generator fuel shortages, and damaged or poorly maintained equipment. Thermally insulated storage containers may be used to maintain their contents within particular temperature ranges in these or other instances of temporary absences of powered refrigeration.

SUMMARY

According to one embodiment, a storage container is provided that comprises a plurality of walls. Each of the walls has an interior surface, an exterior surface, and a wall thickness defined between the surfaces. Together, the interior surfaces of the walls at least partially define an enclosed storage space. Adjoining walls may have a thermal leak path located between them. The thermal leak path extends from the enclosed storage space to an exterior location outside the container. The thermal leak path between each pair of adjoining walls has a length that is greater than the wall thickness of each adjoining wall. Each of the walls of the storage container may be formed of at least one super-insulating panel.

In accordance with another embodiment, a storage container is provided that comprises a plurality of walls that are arranged to at least partially define a storage space. At least one of the walls may include two or more overlapping super-insulating panels with an adhesive layer disposed between at least two of the super-insulating panels.

According to another embodiment, a storage container may include a plurality of walls arranged to at least partially define a storage space. At least one of the walls includes first and second super-insulating panels having respective first and second perimeters. The second perimeter is larger than the first perimeter and the first and second super-insulating panels overlap to thereby provide the at least one wall with an at least double insulation thickness. The at least one wall also includes a complex edge profile extending around at least a portion of the periphery of the wall.

In accordance with another embodiment, a storage container may be provided that comprises a plurality of walls arranged to at least partially define a storage space. At least two of the walls each include a super-insulating panel. At least one pair of the walls has adjacent edges that are complimentary in shape. The adjacent edges are mated together to define an interface, and the shortest distance along the interface from outside the storage container to the storage space is greater than the individual thicknesses of the two walls in the pair.

In accordance with another embodiment, a storage container may be constructed from a plurality of walls to define a storage space. At least some of the walls each comprise an interior surface, an exterior surface, at least one edge extending between the interior and exterior surfaces, and a number of super-insulating panels disposed between the interior and exterior surfaces. The interior and exterior surfaces are spaced from one another, generally parallel to one another, and have respective perimeters. The perimeter of the exterior surface is larger that of the interior surface. The at least one edge includes a step-shape and has a number of step surfaces that are parallel to the interior and exterior surfaces. Each of the step surfaces lies in a plane that extends between two super-insulating panels. The number of step surfaces is one less than the number of super-insulating panels. Mating edges of a pair of adjoining walls may define an interface between them, and the shortest distance along the interface from outside the storage container to the storage space is greater than the thickness of the individual walls of the pair.

BRIEF DESCRIPTION OF THE DRAWINGS

One or more preferred exemplary embodiments of the invention will hereinafter be described in conjunction with the appended drawings, wherein like designations denote like elements, and wherein.

DETAILED DESCRIPTION OF THE PREFERRED EMBODIMENT(S)

Figure 1:
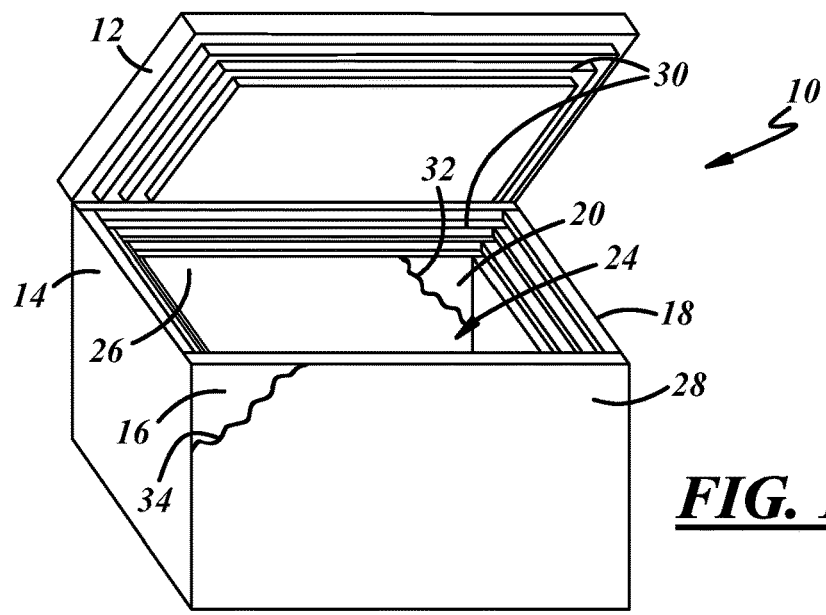
FIG. 1 is a perspective view of an exemplary storage container according to one embodiment.

Thermally insulated storage containers may generally be categorized as either active storage containers or passive storage containers. Active storage containers typically include some type of refrigeration or heating device that converts some other type of energy, such as electrical energy, into thermal energy to be either transferred into a storage area of the storage container or to be used to extract thermal energy out of the storage area. Passive storage containers, on the other hand, typically do not rely on any such external device, instead relying on thermally insulating materials and/or thermal mass to maintain storage area temperatures within a given range. Thermal mass, as is sometimes used with passive storage containers—particularly for maintaining storage area temperatures below normal atmospheric temperatures—may be in the form of wet ice, dry ice, cold packs of water or gel, and/or a phase change material. Generally, thermal mass materials work on the principle of increasing the overall heat capacity of the storage area of the container so that more energy exchange is required between the storage area and the exterior environment to change the temperature of the storage area by a particular amount. Where a container is constructed such that it allows a given amount of thermal energy transfer into or out of its storage area, an increased thermal mass in the storage area may extend the amount of time that the storage area will remain within the desired temperature range. This amount of time that the storage area of a passive container remains in the desired temperature range may also be known as the "autonomy" of the container.

Another manner in which the autonomy of a passive container may be increased is further restriction of thermal energy exchange between the storage area and the external environment (also referred to as a thermal loss). Constructing the storage container from materials having better thermal insulating properties (for example, lower thermal conductivity) or using thicker insulating materials are a few of the available methods of reducing the thermal loss. Other factors that may affect the autonomy of a passive storage container include the amount of air transfer or gas exchange between the storage area and the external environment, the thermal mass of the contents being stored, the temperature of the external environment, and/or the surface area of the container, to name a few. Active storage containers may also utilize low thermal conductivity materials, thicker insulating materials, and/or additional thermal mass to minimize energy consumption by the active device while maintaining the storage area in the desired temperature range. The thermally insulated storage containers disclosed herein may be used as either active or passive storage containers or as both, though they may perform sufficiently well so as not to require any active device in some cases.

While providing additional thermal mass, increasing container material thickness, and/or using materials having better thermal insulating properties can be successfully used to provide the desired level of autonomy to a storage container, these techniques may be accompanied by certain trade-offs. For example, it may be necessary to include additional thermal mass in the storage area of the container that is in an amount that doubles, triples, or even more so multiplies the required volume of the storage area to accommodate it. This increases the size and weight of the container, increasing shipping costs and reducing the available space in a given shipment for the contents of concern. As the amount of thermal mass increases in relation to the mass of the stored contents, the risk of inadvertent freezing of the contents also increases in systems where cold temperatures are required, such as with medicines and vaccines. Where phase change materials are utilized, expense may be increased because of the specialty nature of the materials and the special handling and disposal sometimes required due to potential toxicity of such materials. Phase change materials may also require long preconditioning periods at temperatures significantly lower than the desired container storage area temperature prior to use. Likewise, using higher thickness materials may increase the size, weight, production cost, and shipping cost of a container, while potentially reducing the portion of the overall volume of a shipment that is useful to store the contents of concern. Utilizing materials that have lower thermal conductivities than conventional thermal insulating materials may also be a costly alternative, particularly when the design of the container allows for higher thermal energy transfer through other portions of the container, thereby undermining any advantage that may result from the use of the more expensive, less thermally conductive materials. Of course, these materials and techniques may be used in concert with the storage containers disclosed below in certain instances.

The term "insulating," as used herein and where used to describe materials and/or elements of storage containers, broadly describes all types of materials or elements that may typically function in a storage container to thermally insulate the storage area of the container from the exterior environment. While theoretically almost any material can provide at least some level of thermal insulation between the storage area and the exterior environment, "insulating" in the context of thermally insulated containers is generally used to describe materials or elements having a thermal conductivity of 0.1 W/m-K or less. The term "super-insulating," as used herein and where used to describe materials and/or elements of storage containers, generally describes materials or elements having a thermal conductivity of less than 0.02 W/m-K. These limiting values on the thermal conductivities of insulating and super-insulating materials should be obtained near a typical room temperature, such as between about 20° C.-30° C. Therefore, super-insulating materials or elements are a subset of insulating materials or elements such that all super-insulators are insulators, but not all insulators are super-insulators.

Exemplary insulating materials that are not super-insulating and that may be suitable for use in insulated storage containers include polymeric materials having foamed or expanded structures. By way of example, expanded polystyrene (EPS) or styrofoam has a thermal conductivity that may range from about 0.03-0.04 W/m-K and is therefore classified as an insulating material, but not as a super-insulating one. Another such material is polyurethane foam. Polyurethane foam may have a thermal conductivity of about 0.02 W/m-K, making it an example of an insulating material that has the lowest possible thermal conductivity without being considered a super-insulating material. Other foamed or expanded polymeric materials may be used as insulating materials, such as expanded polyolefins (polyethylene, polypropylene, etc.). Some non-polymeric materials may be insulating but not super-insulating as well, such as fiberglass, asbestos, and various gases such as air, oxygen, or nitrogen, for example. Where the insulating material is a gas or other fluid, it may be in the form of an insulating element that includes the fluid contained in a sealed, usually rigid, container of a desired shape at normal atmospheric pressure.

Some examples of materials and elements that may be super-insulating include aerogel materials, microporous materials, or vacuum panels. In addition, some noble gases, such as argon (Ar) or xenon (Xe), as well as some gaseous compounds, such as carbon dioxide ($CO_2$), have thermal conductivity values in the super-insulating range. Where a super-insulating gas, such as Ar, Xe, or $CO_2$ is used as a super-insulator, it may be in the form of a super-insulating element that includes the gas contained in a sealed, usually rigid or semi-rigid, container of a desired shape, usually at normal atmospheric pressure.

Aerogel materials are highly nanoporous solids that are known in the art. Silica-based aerogel materials are preferable due to the low thermal conductivity of the solid portion of the porous structure. Examples of suitable aerogel materials may be selected from the Cryogel® family of materials, produced by Aspen Aerogels of Northbridge, Mass., U.S.A., though any aerogel material may be used. Microporous materials are also highly porous materials that include pore sizes on the nanoscale—which generally indicates sizes of 1000 nm or less—and are known in the art. Though typically constructed to be suitable for use in very high temperature applications, they are also suitable for use in cold insulated storage containers. Fumed silica microporous materials are preferred, again due to the low thermal conductivity of the solid portion of the porous structure. One example of a suitable microporous material is the Excelfrax® family of materials, produced by Unifrax LLC of Niagara Falls, N.Y., U.S.A., though other microporous materials may be used.

A vacuum panel generally comprises a hermetically sealed container having an internal pressure lower than atmospheric pressure. Any sealed container having an internal pressure lower than atmospheric pressure that also has an effective thermal conductivity therethrough of less than 0.02 W/m-K is considered a super-insulating element. Sealed containers that are filled only with gases are typically rigid or semi-rigid containers so that they are able to maintain their shape in the presence of an internal/external pressure differential. Some vacuum panels comprise insulating materials in a hermetically sealed container. For example, polyurethane foam or EPS may be encapsulated in a sealed container, such as a gas impermeable polymeric, metallic, or metalized film, that is at least partially evacuated to remove any residual air or other gas from the container. Such a construction is an example of a super-insulating element if its thermal conductivity is less than 0.02 W/m-K. Additionally, super-insulating materials may be encapsulated in a similarly sealed container to form a super-insulating element. For example, aerogel materials or microporous materials may be encased in sealed and evacuated films. Some examples of suitable vacuum panels that include a fumed silica microporous material may be selected from the Vacupor® family of products produced by Porextherm of Kempten, Germany. The high proportion of empty space or void volume within the porous structures of aerogel and microporous materials allows such materials to achieve thermal conductivities as low as 0.004-0.005 W/m-K when evacuated.

Referring now to FIG. 1, an exemplary storage container 10 is shown. Storage container 10 includes walls 12-22 (wall 22 is not visible in this view) and storage area 24. In this embodiment, walls 12-22 include the top wall 12, side walls 14, 16, 18, 20, and bottom wall 22. Top wall 12 may be attached to one of the side walls by a hinge or other means so that it can be opened as shown to enable access to storage area 24, in which or from which the contents requiring insulated storage may be placed or removed. Top wall 12 may also be a separate wall not attached to others, but still removable for storage area access. The storage container 10 may be constructed such that any of the walls 12-22 are removable or can be opened for access to storage area 24.

Each wall includes an interior surface 26, an exterior surface 28, and an edge 30 that extends between the surfaces 26, 28. The interior surface 26 of each of walls 12-22 partially defines storage area 24, and when top wall 12 is in a closed position, walls 12-22 define an enclosed storage area 24 in this embodiment. In some embodiments, such as that shown in FIG. 1, storage container 10 may include interior and exterior linings 32, 34, both shown partially cut-away in the figure. Interior and exterior linings 32, 34 are described together, as they are configured similarly. Each lining 32, 34 may be included as the interior or exterior surface 26 or 28 of one or more of the walls 12-22 and in one embodiment, all of the walls 12-22. Each lining may be one continuous layer along all of the walls other than the access wall (top wall 12 in this example). Alternatively, each lining 32, 34 may be included as a separate interior or exterior layer of each of the interior or exterior surfaces of walls 12-22. Linings 32, 34 preferably are the respective interior and exterior surfaces 26, 28 of all of walls 12-22 and may be constructed from water-resistant materials, such as suitable polymer films, metals, or other materials. In one embodiment each lining is a metallic material, metal foil, or metalized polymeric film that is also reflective (for example, having a low emissivity) so that it reflects radiant energy from the exterior of the container and emits very low levels of radiant energy into the storage area 24. Each lining 32, 34 may be attached or unattached to each of the walls 12-22. In some embodiments, interior lining 32 for a given wall may extend beyond interior surface 26 and toward exterior surface 28 along edge 30 until it reaches exterior surface 28 and/or its lining 34. Each lining 32, 34 may also be constructed from different materials with respect to one another. Storage container 10 may of course include additional components and/or layers not shown in the figure and is not limited to the generally rectangular configuration illustrated.

Figure 2:
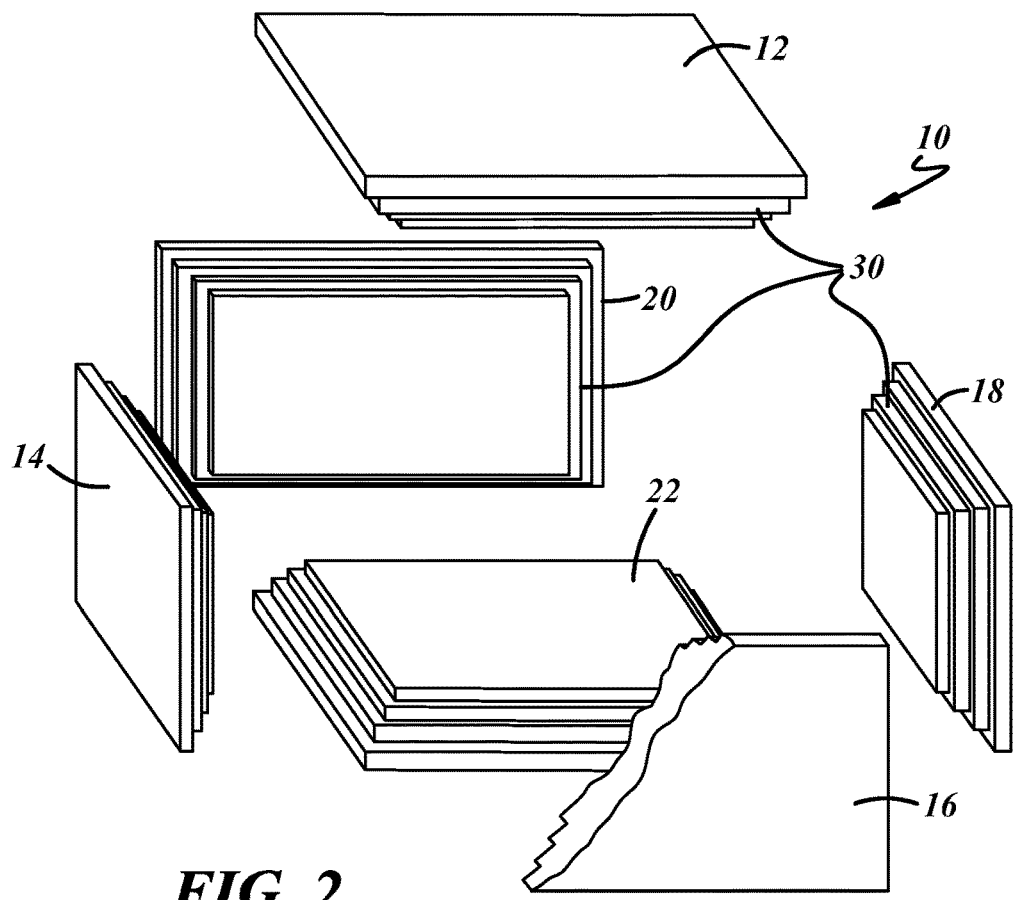
FIG. 2 is an exploded view of the exemplary storage container of FIG. 1.

FIG. 2 is an exploded view of the exemplary storage container 10 of FIG. 1. This view is provided to better illustrate the configuration of walls 12-22, particularly their respective edges 30, and how they may be assembled into storage container 10. Generally, edges 30 that join one another to form portions of storage container 10 are complimentary in shape or profile. In this embodiment, each edge has a step-shaped profile so that adjoining or adjacent edges mate with one another and have a close fit along the various surfaces of each edge. In this example where container 10 comprises six walls 12-22, there are a total of twenty-four edges that join one another in pairs to form twelve edge-long interfaces along edges of the assembled container 10. Each wall may be attached to one or more adjacent walls by a thin layer of adhesive disposed on one or both edges of each pair to be joined. For example, as oriented in FIG. 2, the bottom edge of rear side wall 20 joins the rear edge of bottom wall 22. A thin layer of adhesive material may be disposed along one or both of the two edges and the complimentary-shaped edges may be brought together with the walls held in position by a jig or similar assembly aid while the adhesive material dries or cures. Another side wall, such as left side wall 14 may then be joined with rear side wall 20 and bottom wall 22 after or while the first adhesive layer dries or cures. For example, a thin layer of adhesive may be applied along at least one of the bottom edge of left side wall 14 or the left edge of bottom side 22, as well as to at least one of the rear edge of left side wall 14 or the left edge of rear side wall 20. Left side wall 14 may then be joined to both of the rear wall 20 and the bottom wall 22. Assembly of the bottom wall with the four side walls may continue in this manner until assembly is complete, using a jig or similar assembly aid to keep each side wall in a vertical position while the adhesive materials cure.

Other methods of attachment of the respective wall edges may be used, but adhesive attachment may be preferred because some adhesive materials are also insulating materials, and some adhesive materials may be able to flow to fill or even out any dimensional variations in the various surfaces of the edges 30. For example, a foam adhesive material may be used to attach corresponding edges to one another, such as polyurethane or other type of foam adhesive. As already noted, polyurethane foam is an insulating material and may be useful to help restrict thermal energy transfer between the container storage area and the exterior environment at the interface of adjacent wall edges. Such foam materials may also be good gap fillers where uneven areas exist along any of the edges 30 because foam materials such as polyurethanes can be formulated to expand in place when applied. It may also be desirable that the entire interface formed at each pair of joined edges be filled with the adhesive material.

Figure 3:
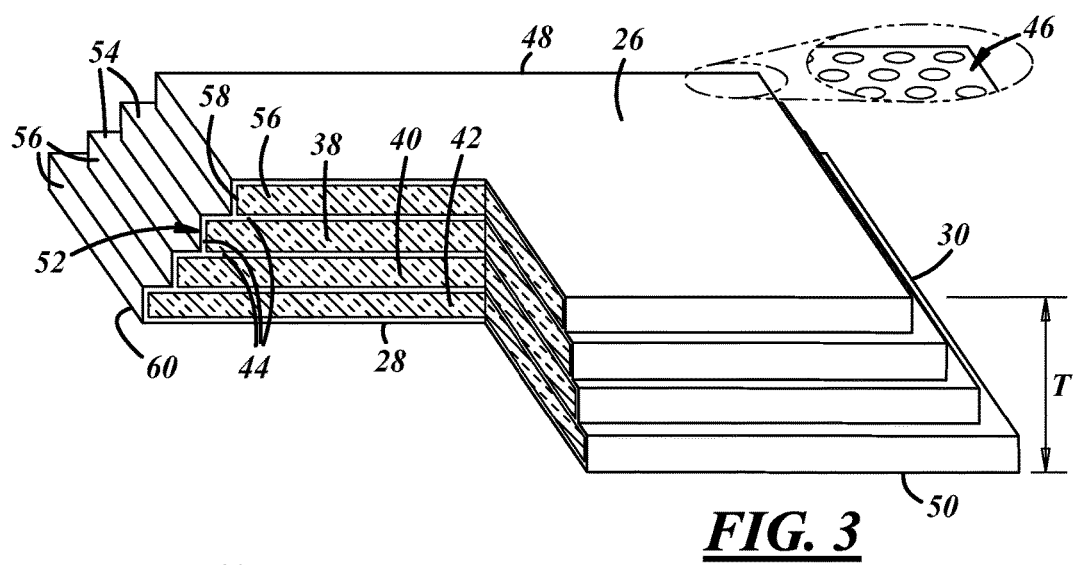
FIG. 3 is a cut-away view of an exemplary wall that may be used in the exemplary storage container of FIG. 1.

Turning now to FIG. 3, a cut-away view of an exemplary wall construction is shown, such as may be used to make storage container 10 of FIG. 1. The exemplary wall shown includes interior surface 26, exterior surface 28, edges 30, super-insulating panels 36-42, and various adhesive layers 44. Interior and exterior surfaces 26, 28 are generally parallel to one another and spaced apart, with the distance between them defining a wall thickness T. As already noted, each of interior and exterior surfaces 26, 28 may include a lining, not shown in FIG. 3. In addition, each of the surfaces 26, 28 may include a texture 46, an example of which is shown in the inset of FIG. 3, including protrusions and/or recesses in a regular or irregular pattern across the respective surface. When assembled into a storage container, texture 46 on interior surface 26 may help prevent surface-to-surface contact between interior surface 26 and contents of the storage area, instead providing a series of potential point contacts, thereby minimizing conductive thermal energy transfer between the wall of the storage container and the contents of the storage area. Similarly, a texture on exterior surface 28 may help prevent surface-to-surface contact between exterior surface 28 and other surfaces outside of the storage container, such as transportation vehicle floors or walls or adjacent storage containers stacked together during shipment or storage, instead providing a series of point contacts, likewise minimizing conductive thermal energy transfer to and from the storage container wall. In one embodiment, the texture 46 includes a regular pattern of protrusions having rounded or pointed ends to facilitate point contact. Each protrusion may extend about 1-2 mm from the surface and have a diameter or width at its base that is about 2-4 mm. Spacing between protrusions may be about 2-4 mm, edge-to-edge, or about 4-8 mm center-to-center. Of course, suitable texture dimensions and types may be different than in this example, governed by the particular needs of the application.

Surfaces 26, 28 include respective outer perimeters 48, 50 (portions of which are not shown in the cut-away view). The outer perimeter 48 of interior surface 26 is smaller than the outer perimeter 50 of exterior surface 28, as is its surface area, and outer perimeter 48 lies within the projected area of perimeter 50. Surfaces 26, 28 are connected to one another along their outer perimeters 48, 50 by the four edges 30 in this embodiment. Each edge 30 includes a complex edge profile 52, which in this case is a step-shaped profile having multiple step surfaces 54 and step thicknesses 56. As used herein, the term "complex edge profile" is used to describe the shape of the edge 30 that extends between the interior and exterior surfaces 26, 28 when its profile in cross-section includes at least one change in direction between the interior and exterior ends of the profile 52. In the example shown in FIG. 3, profile 52 in cross-section includes seven changes in direction between its interior and exterior ends, represented by three step surfaces 54 alternating with four step thicknesses 56. In this embodiment, each step surface 54 lies in a plane that is generally parallel with each of the interior and exterior surfaces 26, 28, the plane of each step surface 54 also lying between a pair of super-insulating panels. In some embodiments having step-shaped edge profiles, there may be more or less step surfaces and/or super-insulating panels, with the number of step surfaces 54 being one less than the number of super-insulating panels. Of course, this is only one example of a complex edge profile and others are possible. For instance, profile 52 may also include one or more curved portions. Where curved portions are included in a particular edge profile, continuous directional change occurs along the profile while moving along the curved portion of the profile from end to end, making a profile having a curved portion a complex edge profile. The utility of complex edge profiles will be described in further detail below.

Exemplary super-insulating panels 36-42 may include any one or more of the super-insulating materials or elements previously described. In a preferred embodiment, each of super-insulating panels 36-42 is a vacuum panel that comprises a silica-based aerogel encased in a sealed and evacuated gas impermeable film. Other types of super-insulating panels may be selected and utilized based on several factors such as cost, weight, ease of manufacturing and assembly, or other factors. Though the two terms share the word "panel," a super-insulating panel is not necessarily a vacuum panel. A super-insulating panel may be a sheet or layer of super-insulating material formed in the desired shape for inclusion in the storage container wall. Super-insulating panels 36-42 may be arranged in the configuration shown, which is an overlapping configuration in which at least portions of two super-insulating panels lie within a common projected area. In this embodiment, the panels 36-42 are arranged parallel with surfaces 26, 28. Super-insulating panel 36 lies nearest interior surface 26, while super-insulating panel 42 lies nearest exterior surface 28. Like the corresponding surfaces 26, 28, panel 36 has an outer perimeter 58 that is smaller than and lies within the projected area of an outer perimeter 60 of panel 42. Panels 38 and 40 have outer perimeters correspondingly larger than perimeter 58 and smaller than perimeter 60, following the step-shape profile of edges 30 as shown. Each panel has a generally constant thickness measured in the same direction as wall thickness T. Any suitable thickness may be used, but a 10 mm thickness may be preferred as a commercially available thickness. While this particular embodiment shows a wall having four overlapping super-insulating panels, any number may be included depending on the thermal requirements of the particular storage container application. Super-insulating panels in general may be arranged in any of a number of various other configurations. Each panel may comprise multiple layers of different insulating or super-insulating materials or elements, for example, such that the overall panel is super-insulating. In another example, each super-insulating panel may comprise multiple panels lying in the same plane, disposed adjacent one another, and/or comprising the same or different materials.

Adhesive layers 44 may be disposed on opposite sides and/or around the periphery of each of the various super-insulating panels as shown, including layers disposed between pairs of overlapped panels to attach them together. In this embodiment, each of the super-insulating panels 36-42 is encapsulated in adhesive material, including the panels lying nearest interior and exterior surfaces 26, 28. Different portions of the adhesive layers may have various layer thicknesses, and in some cases layers may be omitted adjacent one or more panels, between panels, or around the periphery of any of the panels. The adhesive layers shown in this and other figures are not necessarily proportional. In general, the adhesive layer thicknesses are preferably minimized to take full advantage of the super-insulating panels. Sufficient adhesive layer thicknesses may be determined by strength requirements, super-insulating panel protection requirements, material cost limitations and/or thermal performance characteristics, to name a few factors. Adhesive layers 44 are preferably foam adhesives, due to their potential as insulating materials. In one embodiment, the adhesive material includes polyurethane-based foam adhesive material. Some foam adhesives, such as polyurethanes, can form an exterior skin layer expanded into a foam structure, particularly when expansion is volumetrically restricted, such as in a mold cavity (an example of which will be described below). Interior and exterior surfaces 26, 28 may comprise such an exterior skin layer, or as noted previously, linings may form the surfaces 26, 28, in some cases with the linings attached via an adhesive layer 44. The illustrated wall construction may thus have an interior that is entirely filled with overlapping layers of super-insulating panels and adhesive and have a complex edge profile extending around its periphery.

Figure 4:
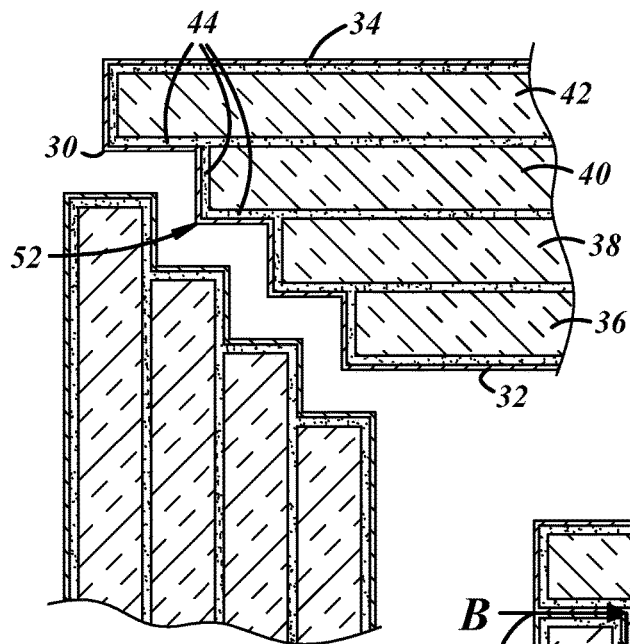
FIG. 4 is a cross-sectional view of complimentary-shaped edges of two exemplary storage container walls, shown unjoined.

Turning now to FIG. 4, sections of two storage container wall portions are shown having exemplary edges 30 that are complimentary in shape so that they can be joined to form an edge joint, and thus a portion of a storage container. For simplicity, only one of the two wall portions is numbered, as the other wall portion is substantially similar and would be numbered the same. Both of the edges 30 of the pair shown include complimentary-shaped complex edge profiles 52, each profile being step-shaped. This particular illustration also shows interior and exterior linings 32, 34 that together completely encase super-insulating layers 36-42 and the various adhesive layers 44. While no boundary is shown between linings 32, 34 a boundary may lie somewhere along an interface formed along edges 30 when they are joined (such as at point 64 or 66 in FIG. 5, for example).

Figure 5:
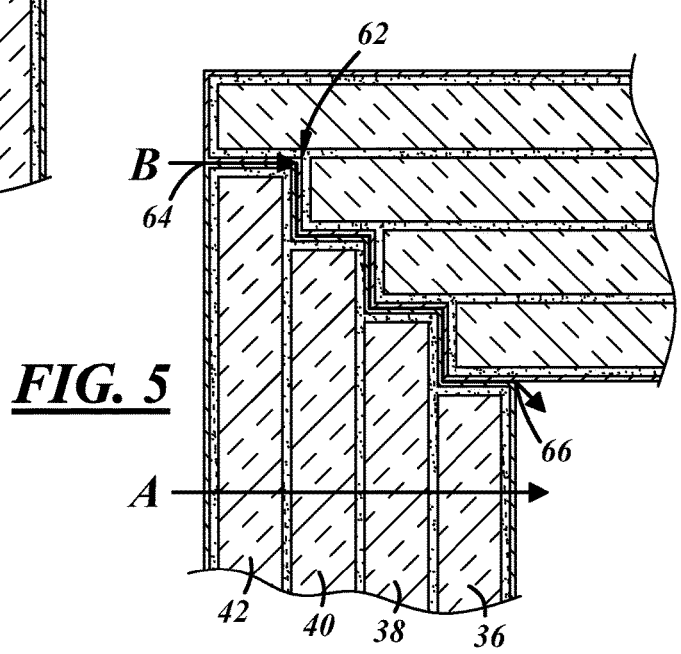
FIG. 5 is a cross-sectional view of the complimentary shaped edges of FIG. 4, shown joined and showing examples of thermal paths A and B.
Figure 6:
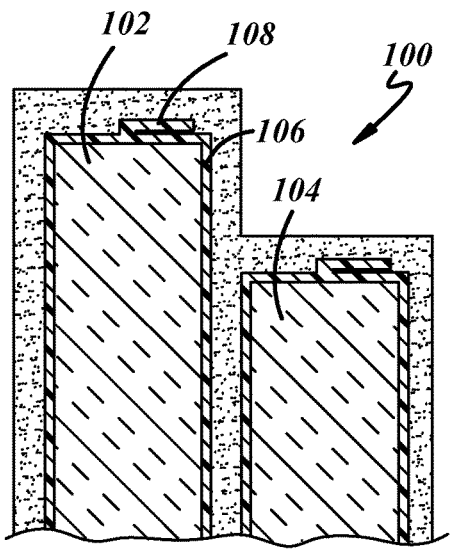
FIG. 6 is a cross-sectional view of an edge of an exemplary wall including super-insulating panels according to one embodiment.

Interface 62 is illustrated in FIG. 5, showing the edges 30 of FIG. 4 joined together in a close-fitting manner, accommodated by the complimentary-shaped profiles. The thin adhesive layer described above in connection with FIG. 2 and the assembly of the storage container is not visible in this figure due to the illustration of path B, described below. The interface 62 is defined by mating complex-edge profiles 52 of FIG. 4. Interface 62, in cross-section as shown, extends between a point 64 on the exterior of the storage container to a point 66 on its interior; i.e., in the storage area. Interface 62 is one example of a thermal leak path, described in further detail below.

There may be an infinite number of theoretical thermal leak paths associated with any storage container, as at least a small amount of thermal energy is transmitted through even the best thermal insulators. But there are thermal leak paths of storage containers that may be of particular interest. The term "thermal leak path" as used herein refers to either the shortest path along the interface of two wall edges, such as interface 62. It may also refer to the shortest path between the storage area of the storage container and the exterior environment that does not pass through a super-insulating material or element. Interface leak paths are of interest because such interfaces at wall joints of storage containers may represent gaps in otherwise continuous wall sections and are therefore of concern as potential areas of thermal loss.

An interface leak path is illustrated in FIG. 5. Interface leak path B extends along interface 62 from point 64 of the exterior environment to point 66 of the storage area. Path A of FIG. 5 represents the shortest path along which thermal energy must travel to move from the exterior environment to the storage area through the entire thickness of the storage container wall, passing through multiple layers of super-insulating panels. The length of path A also represents the length of a conventional interface that would be formed if the two adjoining edges were non-complex and formed a simple butt joint. Due to the complex edge profiles that form the interface 62, leak path B is approximately 75% longer than path A—i.e., path B extends the same distance in the same direction as path A, but additionally extends in a direction perpendicular to path A for about $3/7$ of its total length in this embodiment. In other words, thermal energy must travel 1.75 times further through the interface 62 formed between the complex edge profiles of the adjoined wall edges shown than it would have to travel through a conventional butt joint interface.

The rate of conductive thermal energy loss through a material having a thermal conductivity k may be calculated using the following equation:

$$E' = k(A)(\Delta T)/t$$

where E' is the rate of energy loss in joules per second (J/s) or watts (W); k is thermal conductivity of the material in watts per degree Kelvin per meter (W/m-K); A is the cross-sectional area of the material; ΔT is the temperature differential across the thickness of the material in degrees Kelvin (K); and t is the thickness of the material in meters (m)—or stated another way, the length of the thermal path. For simplification and comparison purposes, the rate of energy loss through interface 62 (along path B) can be expressed as a ratio with another rate of energy loss with which it is being compared. For example, in the following equation:

$$E_B'/E_b' = [k(A)(\Delta T)/t_B]/[k(A)(\Delta T)/t_b]$$

$E_B'/E_b'$ is a ratio of the rate of energy loss along path B to the rate of energy loss along a conventional butt joint (which is equal in length to path A). Where the same type of adhesive, same adhesive layer thickness along the interface, and same temperature differential are used with the two types of joints, the ratio simplifies to $t_b/t_B$. As explained above $t_B$ is about $1.75t_b$ in the illustrated embodiment, making the ratio of the energy loss rates about 0.57. In other words, interface 62 allows thermal energy into the container storage area from the exterior environment at a rate of only about 57% of the rate at which thermal energy would be allowed through a conventional butt joint, a significant improvement. This ratio may change with the number of steps included in the complex edge profile.

Similarly, a comparison can be made between the rate of energy loss along interface 62 (path B) and the rate of energy loss through the entire wall thickness, including super-insulators 36-42 (path A). In the embodiment of FIG. 5, for example, if the four layers of super-insulating panels are constructed from an aerogel material at atmospheric pressure (not evacuated as part of vacuum panels), the thermal conductivity along path A may be about 0.012 W/m-K. If interface 62 is filled with a polyurethane foam adhesive joining the wall edges together, the thermal conductivity along path B may be about 0.02 W/m-K. These values make the ratio of the energy loss rates:

$$E_B'/E_A' = [k_B/t_B]/[k_A/t_A] = [(0.02)/t_B]/[(0.012)/t_A]$$

where identical cross-sectional areas and temperature differentials are assumed for sake of comparison, and subscripts A and B denote paths A and B from FIG. 5. As noted above, $t_B$ is about $1.75t_A$, making the ratio of energy loss rates about 0.95. In other words, the rate of conductive thermal energy loss through interface 62 along path B in the embodiment of FIG. 5 is about 95% of the rate of loss through the entire thickness of the container wall along path A when the entire wall thickness is assumed to be made from an aerogel material at atmospheric pressure. Stated another way, in some cases, the complex edge profiles used to form interface 62, by virtue of their increased length compared to the container wall thickness, can allow joints between adjoining walls to have insulating properties equivalent to those of super-insulators or better, as if the super-insulating material is continuous around the corners of the storage container. Such a configuration renders the shortest thermal paths through the super-insulating materials, such as path A of FIG. 5 the least resistant to thermal energy transmission, thereby ensuring that the more expensive super-insulating materials are fully utilized rather than being undermined by thermal paths that go around them.

Other complex edge profiles may be used to increase the length of the interface thermal leak path such that it is greater than the thickness of the storage container wall, as they are not limited to step-shapes. For example, profiles having curved portions such as wave-shapes may be used. In fact, edge profiles need not be complex to form interfaces between adjoining wall edges that have lengths greater than the corresponding wall thicknesses. For example, a 45-degree beveled edge may be employed along adjoining walls to form an interface having a leak path about 1.4 times the corresponding wall thickness. While this may not be enough to simulate super-insulators at wall joints, it is an improvement over 90-degree butt joints. Additionally, not all edges of all walls need have identical profiles. Some edges may have larger or smaller steps with complimentary-shaped edges provided on adjacent walls.

FIGS. 6-9 illustrate some of the various embodiments of wall constructions that may be used in thermally insulated storage containers. These figures show portions of exemplary walls that have fewer steps in their respective step-shaped edge profiles than shown in previous embodiments, but any number of steps may be included, along with other alternative profile shapes. Wall 100 of FIG. 6 includes two overlapping super-insulating panels 102 encapsulated in foam adhesive. In this embodiment, the super-insulating panels are vacuum panels, each including an insulating material 104 encased in a hermetically sealed container 106. Insulating material 104 can be super-insulating or not super-insulating. Where an insulating material 104 is provided as shown, the container 106 may be constructed from a gas impermeable film, such as certain polymer films, metal foils, or metalized films. Such a container may include sealed ends 108 that are sealed and folded over as shown after being used to provide access for evacuation equipment. In other vacuum panel embodiments, container 106 does not include a solid insulating material, instead containing a gas at low pressure. When filled with a gas such as air and at least partially evacuated, container 106 may be made from a rigid or semi-rigid material, such as a metal or composite material, to enable it to withstand evacuation and the accompanying pressure differential on opposite sides of the container walls. Typical pressures in vacuum panel 102 may range from about 0.001-700 Torr, but preferably range from about 100-700 Torr. Lower pressures generally impart vacuum panels with lower thermal conductivity, but lower pressures also may require more care in handling and in material selection so that the low pressure can be maintained for longer periods of time. Some commercially available vacuum panels have published internal container pressures as low as 0.001 Torr, but at pressures below 100 Torr, the additional decrease in thermal conductivity per unit pressure begins to drop off dramatically. Of course, these types of super-evacuated panels can be used with the storage containers disclosed herein.

Figure 7:
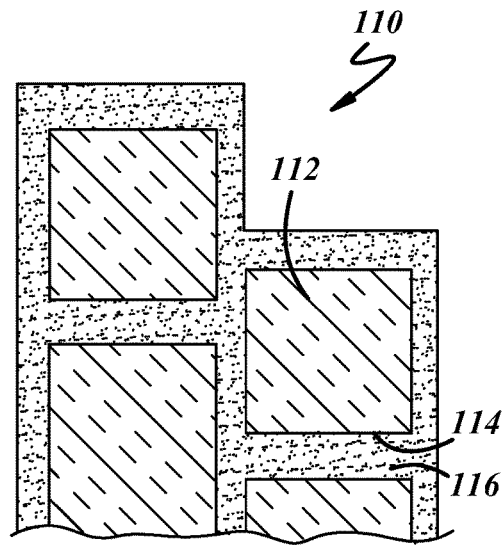
FIG. 7 is a cross-sectional view of an edge of an exemplary storage container wall including overlapping super-insulating panels having apertures formed through them, according to another embodiment.

Wall 110 of FIG. 7 includes two overlapping super-insulating panels 112 encapsulated in foam adhesive. Panels 112 are not vacuum panels and are constructed from super-insulating materials such as aerogel materials or microporous materials. Each panel includes one or more apertures 114 formed through its thickness. The apertures 114 as shown are illustrative only and are not to scale. Their size may be minimized and the spacing between them may be maximized to minimize the formation of additional thermal leak paths between the storage space of the container and the exterior environment. Apertures 114 may have any suitably shaped cross-section, such as round or polygonal. In addition, apertures 114 of overlapping panels may be staggered so that no two apertures are aligned, because aligned apertures will form a shorter thermal leak path than staggered apertures. Foam adhesive 116 may extend into the apertures for secure positioning of the panel within the foam adhesive structure.

Figure 8:
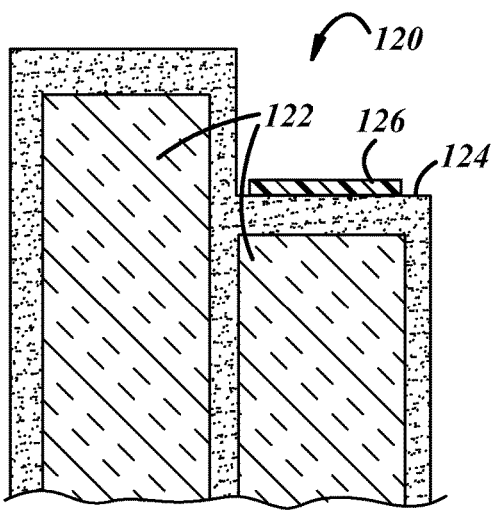
FIG. 8 is a cross-sectional view of an edge of an exemplary storage container wall including overlapping super-insulating panels and a gasket disposed along the edge of the wall, according to another embodiment.

Wall 120 of FIG. 8 includes two overlapping super-insulating panels 122 encapsulated in foam adhesive. Super-insulating panels 122 may be any of the earlier-described super-insulating elements and/or materials. Edge 124 in this embodiment has a gasket 126 disposed along one of its surfaces. While shown in cross-section on only one edge surface in the figure, gaskets 126 may be disposed along any of the surfaces of edge 124 and along more than one surface in some cases. It may extend around the entire periphery of the wall, as well, or may lie along edges of more than one wall. For example, the exemplary storage container 10 of FIG. 1 may include one or more gaskets that lie on the visible edges of the container walls when the top is open or removed. Gasket 126 is preferably a foam material (not necessarily an adhesive) or other polymeric material such as a silicone-based material or other elastomeric material that compresses under load to form a seal. It may be provided for additional sealing at edge interfaces, and sometimes may be the only sealing, such as around the periphery of a removable wall (such as wall 12 of FIG. 1) where adhesive materials cannot be used. In one embodiment, gasket 126 is in the form of an o-ring that is disposed along one or more edge surfaces. It may lie on top of the edge surface as shown, or be partially embedded in the edge surface.

Figure 9:
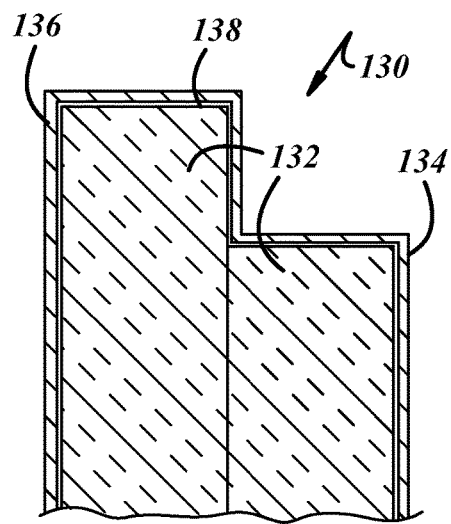
FIG. 9 is a cross-sectional view of an edge of an exemplary storage container wall including overlapping super-insulating panels arranged to be in contact with one another, according to another embodiment.

Wall 130 of FIG. 9 includes two overlapping super-insulating panels 132. Super-insulating panels 132 may be any of the earlier-described super-insulating elements and/or materials. No adhesive foam material is included in this embodiment that is in contact with the super-insulating panels 132. Super-insulating panels 132 are disposed between interior lining 134 and exterior lining 136 in a close-fitting arrangement. The lining materials may be selected based on criteria described earlier or other criteria. An interlining space 138 is formed between the linings 134 and 136. While this space is largely occupied by panels 132, some unoccupied space may remain due to manufacturing tolerances, etc. Linings 134 and 136 can be hermetically sealed together to encapsulate the space 138 and panels 132. The space 138 can be evacuated or reduced in pressure to enhance the thermal properties of the wall 130. Alternatively, space 138 can be filled with a super-insulating gas, such as xenon or argon, to enhance the thermal insulation properties of wall 130.

Figure 10:
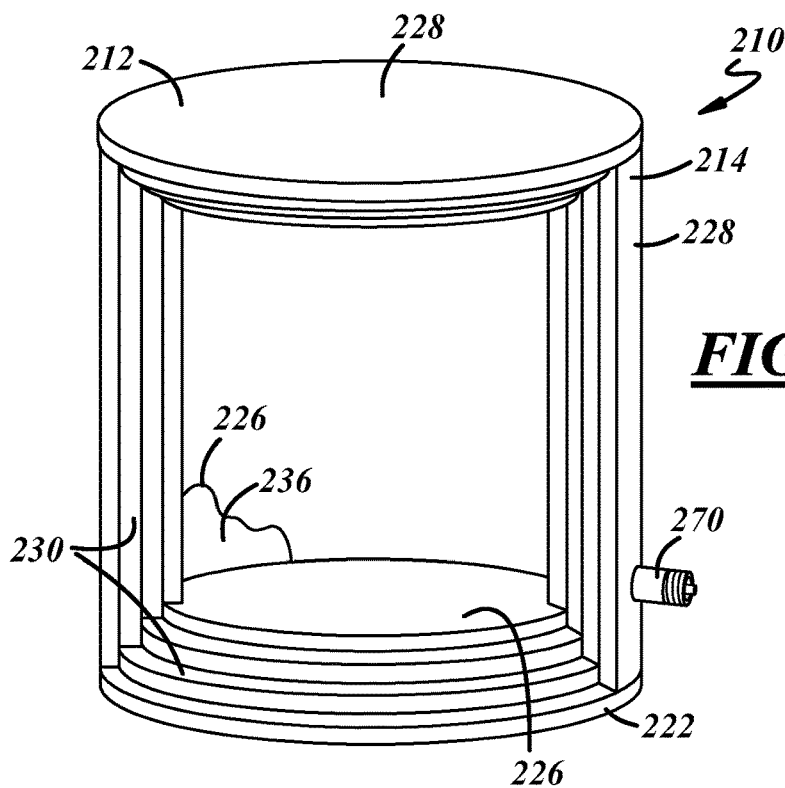
FIG. 10 is a cut-away view of a cylindrical storage container according to one embodiment, including a valve in the cylindrical wall.

Turning now to FIG. 10, another exemplary embodiment of a storage container 210 is shown. Storage container 210 shares many of the features of storage container 10 of FIG. 1, discussed previously, some of which will be noted below. Element numerals are generally the same for similar features with 200 added to each. As shown, storage container 210 is generally cylindrical in shape and includes a removable top wall 212, a side wall 214, and a bottom wall 222. Because of its round shape, container 220 has only one side wall 214, and it is cylindrical in shape. There are a total of only four edges 230 among the three walls. Top wall 212 includes one edge between and circumscribing its interior and exterior surfaces 226, 228. Bottom wall 222 includes a similarly configured edge 230, and side wall 214 includes top and bottom edges than are complimentary in shape and mate with the top wall and bottom wall edges.

In this embodiment, the interior and exterior surfaces 226, 228 of side wall 214 are concentric. Being equally spaced from one another all along each cylindrical surface, they may also be considered parallel with one another for purposes of description herein. Additionally, for descriptive purposes, some other features of container 210 are noted to correlate with features of storage container 10 of FIG. 1. Each of the top and bottom walls 212, 222 have outer perimeters 258, 260 associated with their respective interior and exterior surfaces 226, 228. In this case they may also be referred to as circumferences, but the descriptions regarding relative sizes and locations of each are substantially similar to the corresponding descriptions of the previously described rectangular panels. Because the interior and exterior surfaces of cylindrical side wall 214 are continuous, however, these surfaces do not have discernable outer perimeters. An equivalent perimeter could be calculated by opening each cylindrical surface and treating it as a rectangle, but in this case it is preferable to describe the relative sizes and positions of each surface in terms of their respective surface areas rather than perimeters, with the surface area of interior surface 226 being smaller than the surface area of exterior surface 228 and the surfaces being concentric cylindrical shapes. Side wall 214 may be one continuous wall, but it could also be constructed from more than one side wall section, where each adjoining wall section includes edges having complimentary-shaped profiles. Where super-insulating panels are included in side wall 214, they are curved to follow the cylindrical shape of side wall 214. The panels may also be cylindrical and continuous in the form of concentric sleeve-like shapes, the exterior surface of each cylindrical panel lying adjacent the interior surface of the next larger panel. Or they may include multiple arc-like shapes to extend between the interior and exterior surfaces of the wall 214. Thus, flexible super-insulating panels or panels that are manufactured to shape may be used.

Figure 11:
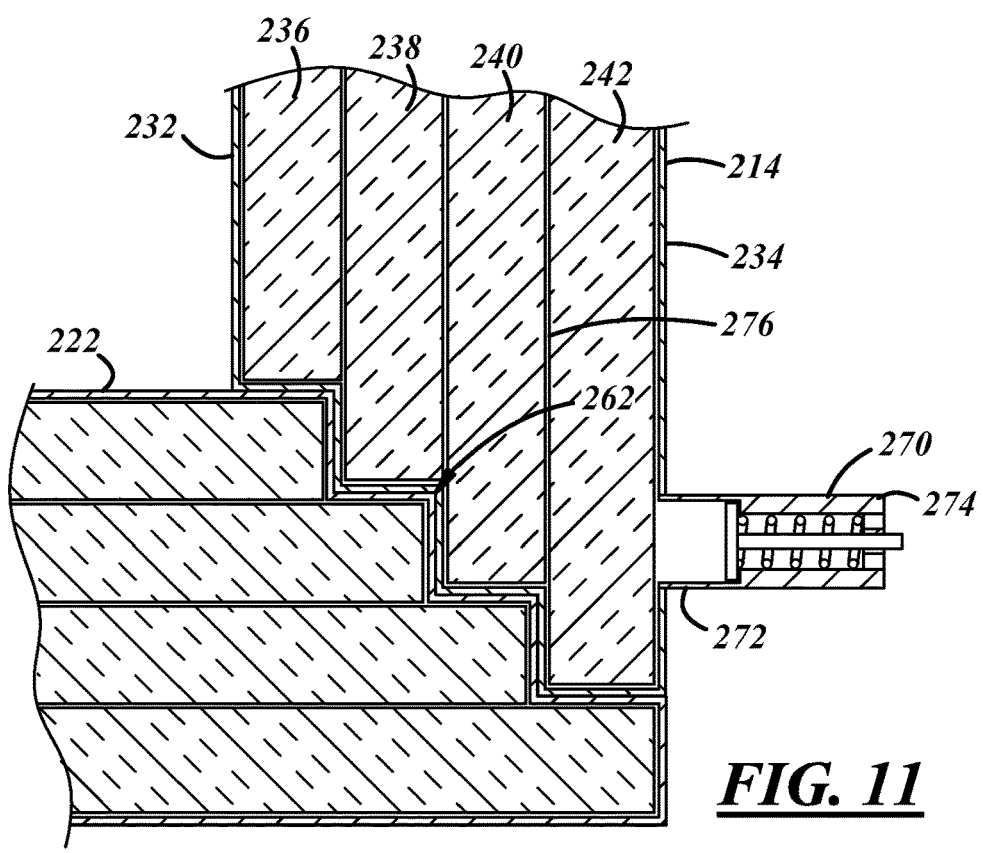
FIG. 11 is a partial cross-section of the storage container of FIG. 10, taken through the valve.

Storage container 210 additionally includes a valve 270 attached to the exterior surface of side wall 214. Valve 270 may be a pneumatic valve such as a Schrader valve, such as commonly used with pneumatic tires for bicycles or automobiles. FIG. 11 shows valve 270, along with a cross-section of the joint between the respective edges of side wall 214 and bottom wall 222. In this embodiment, the wall construction of walls 214, 222 is similar to that shown in FIG. 9 in that there are no adhesive layers between overlapping super-insulating panels 236-242 or at their peripheries. Neither are there adhesive layers between any of the panels and interior and exterior linings 232, 234. Of course this is a non-limiting example, and small amounts of adhesive material may be used during manufacturing to hold panels together for handling or other purposes, or adhesively layers that encapsulate each panel may be included. Generally, though, the type of wall construction illustrated relies more on the structure of interior and exterior linings 232, 234 than on adhesive layers to hold the super-insulating panels in position and to form the overall shape and structure of the walls. For this and other reasons, linings 232, 234 may be constructed from rigid or semi-rigid materials in this embodiment—e.g., metals, composites, etc.—as foils or films may not be able to sufficiently maintain the desired wall shapes. The lining materials may be selected using the additional criteria described previously (water-resistance, reflectivity, etc.), or additional lining layers may be included to provide such characteristics. Stainless steel or aluminum and its alloys are preferred materials for linings 232, 234, in some embodiments, and may be polished or otherwise finished to render either or both lining surfaces reflective. Different lining materials may be selected for different walls, as well, since not all walls may have the same desired performance requirements. Where the edges of adjoining walls come together to form interface 262 as shown with complex edge profiles as previously described, the storage container may benefit from many of the same advantages associated therewith.

In this embodiment valve 270 is attached to the exterior surface of side wall 214—i.e., lining 234. The exact configuration of the internal components of valve 270 is not detailed here. The valve has a container end 272 and a source end 274. The container end 272 mates with an opening in lining 234 to fluidly connect the valve 270 to the space between linings 232 and 234. In this embodiment, linings 232 and 234 are hermetically sealed together by welding or other suitable means. A vacuum source may be attached to the source end 274 of the valve to at least partially evacuate an interliner space 276 between the linings. In a typical embodiment, super-insulating panels 236-242 occupy substantially the entire space 276 between the linings 232, 234, being sized to have a close fit with the linings in the available space. In such a case, there only a small fraction of space 276 that must be evacuated in order to reduce the pressure in the space. A typical pressure range for space 276 after evacuation is 100-700 Torr, with lower pressures providing better thermal insulation but requiring higher strength linings. In a preferred embodiment, super-insulating panels 236-242 are not vacuum panels, instead being another type of super-insulating element such as aerogel or microporous panels so that the porous structure of the panels can be evacuated simultaneously with space 276. Of course vacuum panels may alternatively be utilized and may reduce the level of evacuation necessary for space 276.

Constructing linings 232, 234 from metallic materials such as stainless steel, aluminum or other materials provides not only sufficient structure to support the super-insulating panels 236-242 and strength to withstand the pressure differentials created by evacuating space 276, it also imparts gas-impermeability to the linings so that storage area gases and atmospheric gases cannot permeate through the linings 232, 234 and increase the pressure in space 276, which would increase the overall thermal conductivity of the wall. Alternatively, high-strength polymeric materials or composites may be used as lining materials. In such cases, it may be useful to metalize or coat the surfaces of the linings with a metallic material by such methods as plating, cold spray, or vacuum metalizing to better render these types of polymer-based materials gas-impermeable.

In another related embodiment valve 270 may be used to at least partially evacuate space 276 and to then flood sealed space 276 with a super-insulating gas, such as Ar, Xe, or $CO_2$. Each of these, and some other gases, has a thermal conductivity value of less than 0.02 W/m-K. In one embodiment, at least one of walls 212, 214, or 222 comprise linings 232 and 234 hermetically sealed together to define space 276, where space 276 is at least partially filled with a super-insulating gas. In such a construction, the super-insulating gas can replace what would normally be air surrounding and at least partially permeating, in some cases, the super-insulating panels 236-242. The pressure in space 276 can be at, above, or below atmospheric pressure, but is preferably close to atmospheric pressure. The long-term maintenance of the thermal insulating properties of such a container is increased over other sealed super-insulating elements that rely on low pressure evacuation, because over time, small leaks or permeation may occur through the linings or containers. With a pressure differential between container inner and outer walls such as exists with vacuum panels, the leak rate may be higher than with an internal gas at or near atmospheric pressure, for example. Super-insulating gases are also better insulators than air because they have lower thermal conductivities and because they are heavier than air, reducing convective heat transfer as well. Of course, valve 270 and its associated variations are optional, as storage container 210 may include walls constructed in accordance with previously disclosed features such as various adhesive layers between and/or encapsulating each super-insulating panel. Additionally, any of the previously described embodiments, such as storage container 10 of FIG. 1, may be modified to include a similar valve for similar uses.

Figure 12:
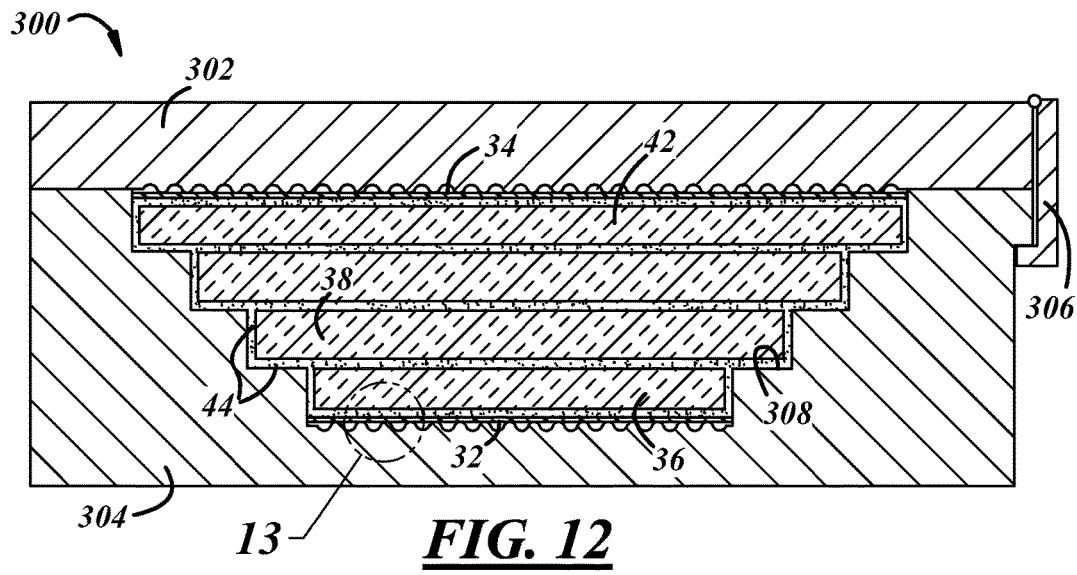
FIG. 12 is a cross-sectional view of an exemplary mold that may be used to form a storage container wall according to one embodiment.
Figure 13:
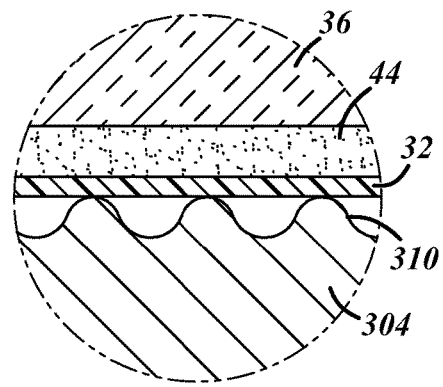
FIG. 13 is an enlarged view of a portion of FIG. 12, showing a textured mold surface.

FIG. 12 shows a cross-sectional view of an exemplary mold 300 that may be used to form a storage container wall according to one embodiment. Mold 300 includes upper half 302, lower half 304, and closure 306. Mold 300 may be used to make a storage container wall such as that of FIG. 3. As shown, mold 300 has a clam-shell configuration, where upper half 302 has a hinged attachment to lower half 304 and is shown in a closed position. Lower half 304 includes cavity 308, which is shaped in the desired shape of the final wall configuration. With the mold 300 in an open position, material for interior lining 32 may be placed into the cavity 308. This step may be omitted where lining 32 is not necessary or where it is a continuous lining covering more than one wall surface in the final storage container. A first adhesive layer 44 is then deposited in the mold cavity 306 and/or onto one surface of super-insulating panel 36, and panel 36 is place into the cavity. A second adhesive layer may then be deposited in the cavity 306 over panel 36 (or on a surface of the next panel 38), followed by placement of super-insulated panel 38. This sequence may continue until the desired number of panels is placed into the mold cavity and a top adhesive layer is deposited on panel 42, in this example. Optional exterior lining 34 may be placed on top of the overlapping layers of panels and adhesive layers. Upper half 302 can then be lowered to close mold 300 and secured to lower half 304 with closure 306, or other closing or clamping mechanism sufficient to hold the two mold halves together.

Where foam adhesive materials such as polyurethanes are used, the mold 300 is typically held closed with a clamping force or closure that can withstand the pressure generated in the mold cavity 308 while the foam material expands. As shown in FIG. 12, and in FIG. 13 as well, the mold cavity is filled with the necessary materials to make a storage container wall, but has not fully expanded. The mold cavity 308 in this example includes texture 310 in its bottom surface to provide the final interior surface of the wall with texture. The particular texture shown is an alternating protrusion and recess texture that may have the general dimension disclosed previously and shown in FIG. 3 as texture 46. As the foam adhesive expands in the closed mold and cavity, it may force interior and exterior linings 32, 34, where present, into the texture 310 so that its mirror image is present in the final surfaces of the wall. Mold 300 can remain closed until the adhesive is sufficiently cured, after which upper half 302 can be raised and the finished wall can be removed from the mold. Of course, additional process steps may be included, such as trimming the wall after it is molded, etc., or preparing the mold for making a wall using mold release agents, etc.

Figure 14:
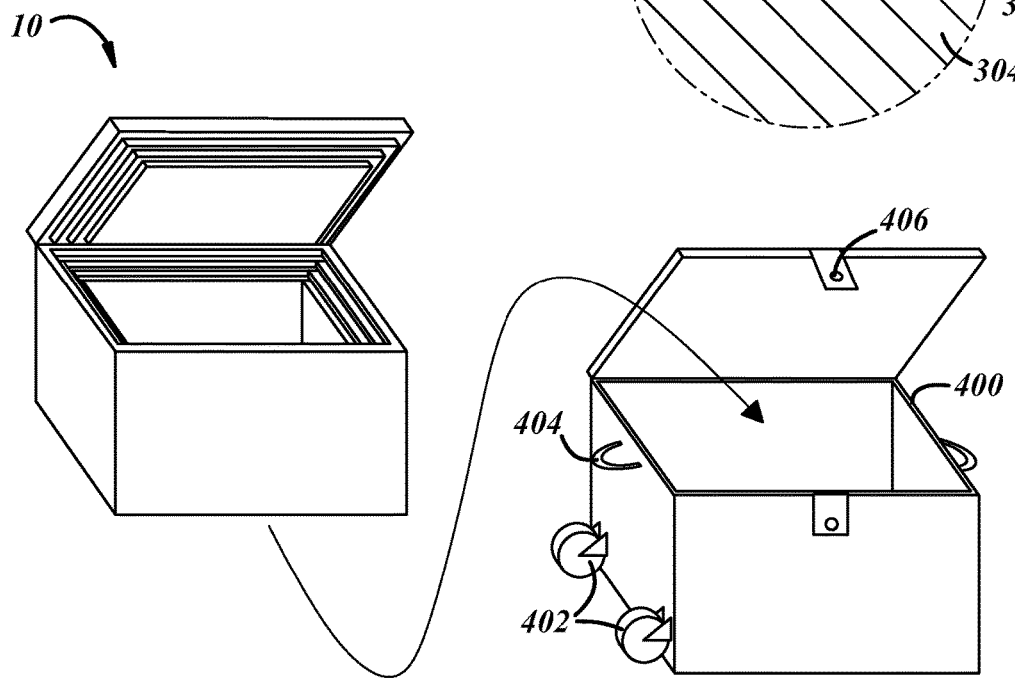
FIG. 14 is the storage container of FIG. 1 shown together with a transport case in which the storage container can be placed.

FIG. 14 illustrates a transport case 400 that may be used with exemplary storage container 10, for example. Generally, case 400 is used to provide the storage container with more convenient means of transport, such as rolling or carrying, by including certain hardware such as wheels 402 and/or handles 404. The case may also include a latch or other closure 406 to completely enclose the storage container during transport. Other closures such as zippers around the opening of case 400 may be used, as well as other types of transport aids, such as shoulder straps, etc. Case 400 preferably includes walls constructed from a flexible material such as nylon or other fabric so that it can easily be collapsed when not in use to save space. Case 400 may also be used to enhance the aesthetics of storage container 10 and have pockets for identification tags or accessory storage.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A storage container, comprising: a plurality of walls arranged to at least partially define an enclosed storage space, each one of the walls including a first super-insulating panel having a first perimeter and a second super-insulating panel having a second perimeter that is larger than the first perimeter, wherein the first and second panels overlap with the first perimeter lying entirely within the second perimeter to thereby provide each wall with an at least double super-insulation thickness and a complex edge profile extending around the entire periphery of the wall, such that the complex edge profile of each wall joins the complex edge profile of at least one of the other walls of the plurality of walls, the storage container further comprising an adhesive layer located where at least some of the complex edge profiles join one another, wherein the adhesive layer is an insulating material having a thermal conductivity of 0.1 W/m-K or less.

2. A storage container, comprising: a plurality of walls arranged to at least partially define a storage space, wherein at least one of the walls includes two or more overlapping super-insulating panels, each of the super-insulating panels being an aerogel panel or a microporous panel having a thermal conductivity less than 0.02 W/m-K at atmospheric pressure, and an adhesive layer disposed between at least two of the super-insulating panels, wherein the adhesive layer is an insulating material having a thermal conductivity of 0.1 W/m-K or less.

3. A storage container, comprising: a plurality of walls arranged to at least partially define an enclosed storage space, each one of the walls including a first super-insulating panel having a first perimeter and a second super-insulating panel having a second perimeter that is larger than the first perimeter, wherein the first and second panels overlap with the first perimeter lying entirely within the second perimeter to thereby provide each wall with an at least double super-insulation thickness and a complex edge profile extending around the entire periphery of the wall, such that the complex edge profile of each wall joins the complex edge profile of at least one of the other walls of the plurality of walls, wherein each super-insulating panel is encapsulated in an insulating material that is not a super-insulating material, the insulating material having a thermal conductivity between 0.02 and 0.1 W/m-K, wherein each super-insulating panel has one or more apertures defined through the panel, the insulating material extending into the one or more apertures.

4. A storage container, comprising: a plurality of walls arranged to at least partially define a storage space, wherein at least one of the walls includes two or more overlapping super-insulating panels, each of the super-insulating panels being an aerogel panel or a microporous panel having a thermal conductivity less than 0.02 W/m-K at atmospheric pressure, and an adhesive layer disposed between at least two of the super-insulating panels, wherein each super-insulating panel is encapsulated in an insulating material that is not a super-insulating material, the insulating material having a thermal conductivity between 0.02 and 0.1 W/m-K, wherein each super-insulating panel has one or more apertures defined through the panel, the insulating material extending into the one or more apertures.

* * * * *